(12) United States Patent
Sugden

(10) Patent No.: US 7,587,886 B1
(45) Date of Patent: Sep. 15, 2009

(54) LAWNMOWER WITH CUTTER DECK LOCATOR ASSEMBLY

(75) Inventor: David J. Sugden, Horicon, WI (US)

(73) Assignee: Scag Power Equipment, Inc., Mayville, WI (US)

( * ) Notice: Subject to any disclaimer, the term of this patent is extended or adjusted under 35 U.S.C. 154(b) by 0 days.

(21) Appl. No.: 12/046,962

(22) Filed: Mar. 12, 2008

Related U.S. Application Data

(60) Provisional application No. 61/017,231, filed on Dec. 28, 2007.

(51) Int. Cl.
*A01D 34/00* (2006.01)
(52) U.S. Cl. ...................................... 56/14.9
(58) Field of Classification Search ................ 56/14.9, 56/15.9, 15.8, 15.5, 15.7, 17.1, 14.7, 6, 16.3, 56/10.8, 121.46, 16.7; 180/6.48, 19.1, 53.4
See application file for complete search history.

(56) References Cited

U.S. PATENT DOCUMENTS

| | | | | |
|---|---|---|---|---|
| 3,874,150 A | * | 4/1975 | Boeck | 56/17.1 |
| 3,948,025 A | * | 4/1976 | Erdman | 56/10.1 |
| 4,325,211 A | | 4/1982 | Witt et al. | |
| 4,700,536 A | | 10/1987 | Torras | |
| 4,882,898 A | * | 11/1989 | Samejima et al. | 56/208 |
| 5,025,617 A | * | 6/1991 | Kuhn et al. | 56/15.6 |
| 5,483,789 A | * | 1/1996 | Gummerson | 56/15.5 |
| 5,937,625 A | * | 8/1999 | Seegert | 56/15.6 |
| 5,956,932 A | * | 9/1999 | Schmidt | 56/15.6 |
| 6,223,510 B1 | * | 5/2001 | Gillins et al. | 56/15.1 |
| 6,293,077 B1 | * | 9/2001 | Plas et al. | 56/17.1 |
| 6,460,318 B1 | | 10/2002 | Ferris et al. | |
| 6,470,660 B1 | * | 10/2002 | Buss et al. | 56/15.9 |
| 6,584,756 B2 | * | 7/2003 | Buss | 56/15.6 |
| 6,679,037 B1 | * | 1/2004 | Hitt et al. | 56/15.6 |
| 6,698,172 B2 | | 3/2004 | Ferris et al. | |
| 6,711,885 B2 | | 3/2004 | Ferris | |
| 6,912,833 B2 | * | 7/2005 | Buss | 56/15.6 |
| 6,988,351 B2 | * | 1/2006 | Schick et al. | 56/15.9 |
| 7,028,456 B2 | * | 4/2006 | Thatcher et al. | 56/15.6 |
| 7,197,863 B1 | * | 4/2007 | Sugden | 56/15.9 |
| 2003/0188905 A1 | * | 10/2003 | Buss | 180/200 |

* cited by examiner

*Primary Examiner*—Árpád Fábián-Kovács
(74) *Attorney, Agent, or Firm*—Boyle Fredrickson S.C.

(57) ABSTRACT

A lawnmower cutter deck is fitted with a side-to-side deck locator comprises first and second laterally spaced bearings that are disposed longitudinally between the cutter deck and the lawnmower frame. Each of the bearings is laterally spaced from a corresponding stop when the deck is centered relative to a longitudinal centerline the frame and permits limited lateral movement of the cutter deck relative to the frame through a stroke corresponding to the width of the space. Each of the bearings is movable vertically along the corresponding stop so as to permit uninhibited vertical movement of the cutter deck relative to the frame and pivoting of the cutter deck about longitudinal and lateral axes. A fore and aft locator may also be provided and be connected to the cutter deck and to the frame to at least substantially prevent fore and aft movement of the cutter deck relative to the frame.

19 Claims, 5 Drawing Sheets

LAWNMOWER WITH CUTTER DECK LOCATOR ASSEMBLY

CROSS-REFERENCE TO RELATED APPLICATION(S)

This application claims priority from U.S. Provisional Patent Application Ser. No. 61/017,231 filed on Dec. 28, 2007, the entire contents of each of which is hereby expressly incorporated by reference into the present application.

BACKGROUND OF THE INVENTION

1. Field of the Invention

The invention relates to lawnmowers and to cutter decks usable there with. More particularly, the invention relates to a locator assembly for a lawnmower cutter deck.

2. Discussion of the Related Art

Riding lawnmowers and some larger walk behind lawnmowers have multi-bladed cutter decks supporting two, three, or even more cutting blades. Such lawnmowers may cut a strip of grass from 24 inches to 72 inches wide or even more. The cutter deck typically can be raised from a cutting height located near the ground to a travel height located above the ground. The cutting height also can be adjusted by raising or lowering the cutter deck through a more limited stroke and latching the cutter deck in position.

The cutter deck of any lawnmower must be positioned generally parallel to the ground to maintain an even cut. Factors such as initial manufacturing tolerances and subsequent wear in the lawnmower frame, the cutter deck, and the cutter deck supports hinder cutter deck leveling both at initial manufacture and over time. Many cutter decks therefore incorporate some mechanism to perform limited "leveling" of the cutter deck. For instance, some lawnmowers permit "pitch" or "fore and aft" leveling by adjusting the length of adjustable links coupling front and rear cranks to one another. The cranks are rotated in unison during normal operation to move the deck between its cutting and transport positions and to vary the cutting height. By rotating the front and rear cranks relative to one another, the heights of the upper end of the deck supports at the front and rear of the deck are altered relative to one another, altering deck pitch.

Cutter decks often are suspended from the lawnmower frame by chains. In this case, pitch adjustment adjusts the height of the upper ends of the front chains relative to the rear chains. Being flexible, the chains permit the deck to rise up and over an obstruction upon contact without interference from the structure coupling the cutter deck to the lawnmower frame, thus preventing or inhibiting damage to the deck upon encountering obstructions and inhibiting scalping of the grass. However, because the chains lack rigidity in all planes, the deck may sway fore and aft and/or side-to-side during cutting, resulting in uneven cuts. For this reason, so-called locators are sometimes provided that link the cutter deck to the frame so as to allow the deck to move vertically relative of the frame while preventing or at least inhibiting fore and aft or side-to-side motion. However, the links forming these locators, when provided, are typically inflexible. They therefore can accommodate little, if any, relative side-to-side or fore and aft motion between the deck and the frame. This may result in damage to the cutter deck upon encountering an obstruction. In addition, in allowing only vertical movement of the cutter deck, some decks cannot tilt to accommodate changes in surface topography.

Some of these problems have been recognized prior to development of this invention, but prior attempted solutions proved inadequate and/or raised new problems that have yet to be addressed.

For instance, U.S. Pat. No. 6,079,193 to O'Neill et al. discloses a lawnmower suspension system with a lost motion connection that allows limited side-to-side movement of a front-mounted cutter deck. The cutter deck is mounted on the lawnmower frame by first and second opposed arms. Each of the arms is coupled to the frame by a lost motion coupling in the form of an oversized sleeve that receives a relatively small-diameter pin. The circumferential clearance between the pin and the sleeve permits limited vertical movement of the cutter deck relative to the frame, and the axial clearance between the end of the pin in the end of the sleeve permits limited side-to-side movement of the deck relative to the frame. While this arrangement permits both vertical and lateral movement of the deck relative of the frame, it couples the two movements together and, as a result, prevents or inhibits pivoting of the deck relative of the frame. The lost motion coupling is also relatively complex to manufacture and assemble and risks invasion by dirt and debris. It also is not usable with widely-used center-mounted cutter decks that are suspended from the frame by chains or other flexible couplings.

Other systems, such as the one disclosed in U.S. Pat. No. 4,700,536 to Torras, permit pivoting motion of the cutter deck relative to the frame but do not permit side-to-side or vertical motion of the cutter deck relative to the frame.

The need therefore exists to provide a deck locator for a suspended cutter deck that permits limited side-to-side movement of a cutter deck relative to a frame independently of any vertical or pivoting movement.

The need also exists to provide a deck locator that is robust, easy to install, and simple to maintain.

SUMMARY OF THE INVENTION

In accordance with a first aspect of the invention, a side-to-side deck locator is provided that permits the cutter deck to move vertically and to pivot about both longitudinal and lateral axes while permitting limited side-to-side motion. The side-to-side deck locator comprises first and second laterally-spaced bearings that are disposed longitudinally between the cutter deck and the frame. Each of the bearings is laterally spaced from a corresponding stop when the deck is centered relative to a longitudinal centerline of the frame, thus permitting limited lateral movement of the cutter deck relative to the frame though a stroke corresponding to the width of the space. Each of the bearings is movable vertically along the corresponding stop so as to permit uninhibited vertical movement of the cutter deck relative to the frame as well as pivoting of the cutter deck about longitudinal and lateral axes.

In one embodiment, the bearings are mounted on the frame and the stops are mounted on the cutter deck, and each of the bearings is held in place by being clamped between a vertical surface on the frame and a mounting bar bolted to the frame. A spacer may be clamped between each bearing and the vertical surface of the frame.

In accordance with another aspect of the invention, a fore and aft locator is connected to the cutter deck and to the frame to at least substantially prevent fore and aft movement of the cutter deck relative to the frame. The fore and aft locator may, for instance, be formed from turnbuckles that are pivotally attached to the frame and the cutter deck.

Various other features, embodiments and alternatives of the present invention will be made apparent from the following detailed description taken together with the drawings. It should be understood, however, that the detailed description and specific examples, while indicating preferred embodiments of the invention, are given by way of illustration and not limitation. Many changes and modifications could be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings, in which like reference numerals represent like parts throughout, and in which.

DETAILED DESCRIPTION OF THE PREFERRED EMBODIMENTS

A cutter deck assembly constructed in accordance with a preferred embodiment of the invention is described below in connection with a riding zero turn lawnmower. However, it should be understood that the illustrated cutter deck assembly and others constructed in accordance with the invention could be used with other riding lawnmowers and with other zero turn or other walk behind or stand on lawnmowers.

Figure 1:
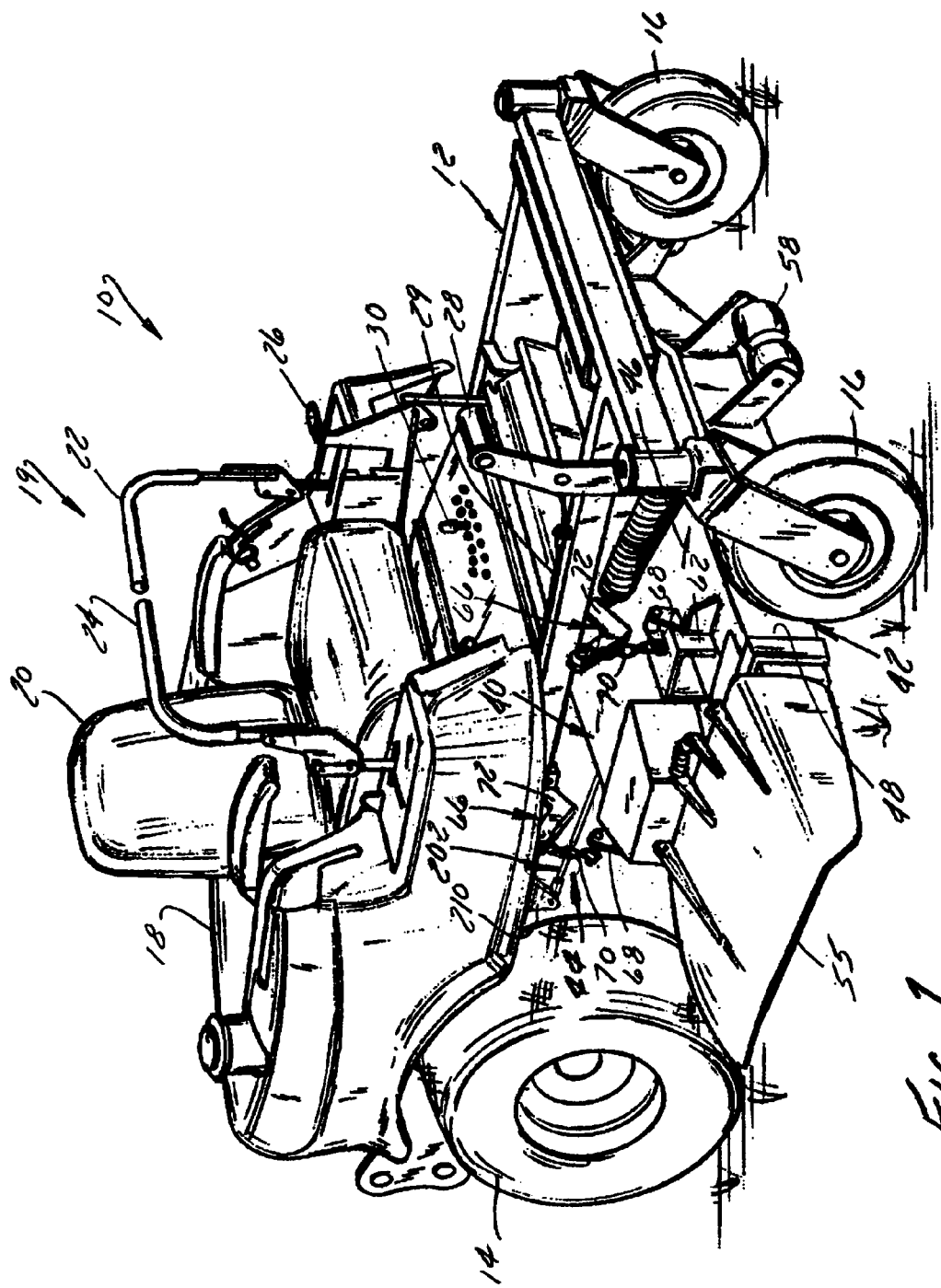
FIG. 1 is a right side elevation view of a zero turn lawnmower incorporating a cutter deck having a deck locator assembly constructed in accordance with a preferred embodiment of the present invention.
Figure 2:
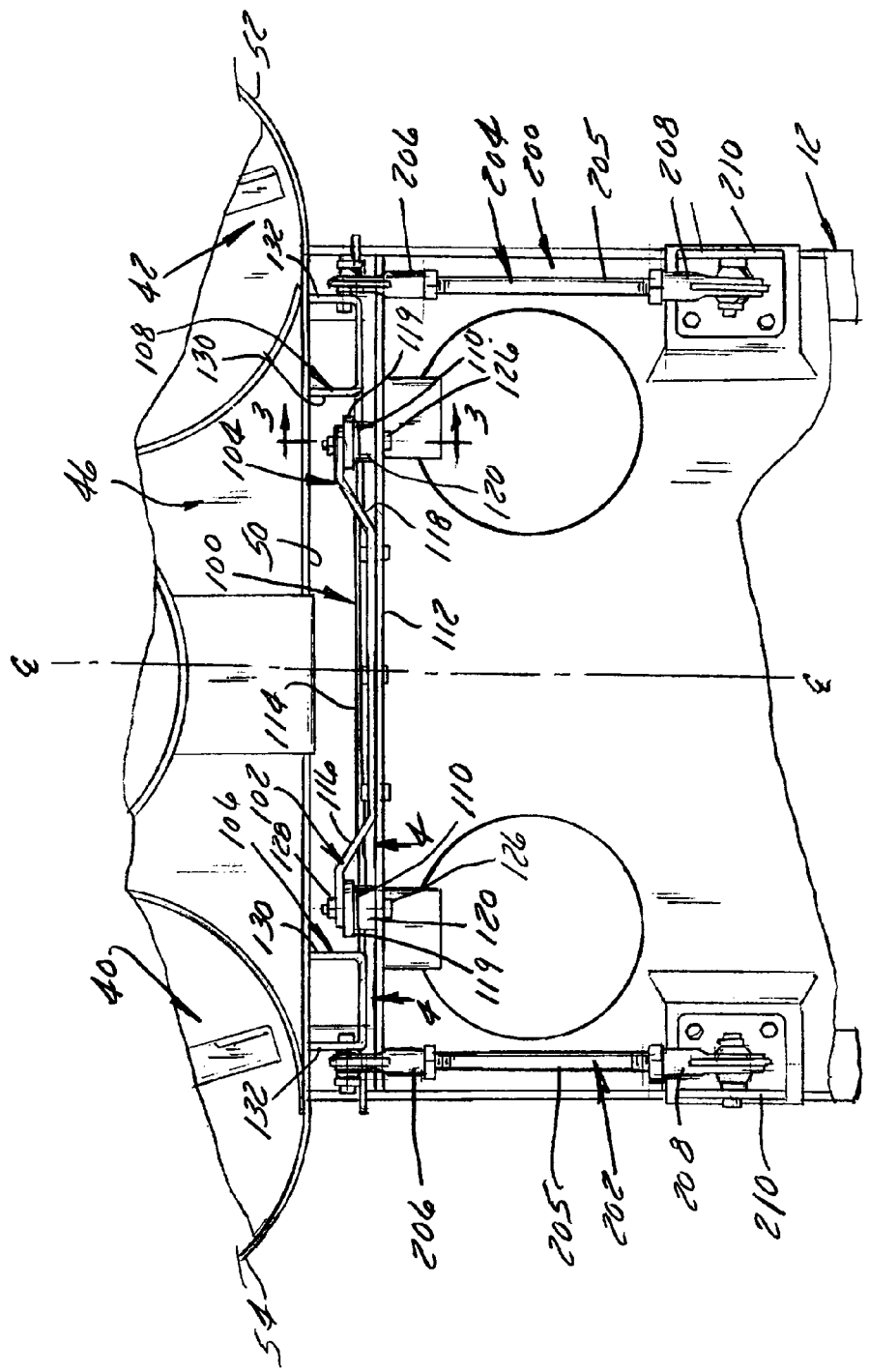
FIG. 2 is fragmentary plan view of a portion of the cutter deck, a portion of the frame, and a deck locator assembly constructed in accordance with a preferred embodiment of the invention.

Referring to FIGS. 1 and 2, the zero turn lawnmower 10 includes a frame 12 supported on driven rear wheels 14 and undriven front wheels or casters 16, an engine 18 mounted on the rear of the frame 12, an operator's seat 20 mounted on the frame 12 in front of engine 18, and operator's controls 19. The operator's controls 19 include left and right steering levers 22, 24, a brake handle 26, a foot-operated deck lift pedal 28, and a hand operated deck cutting height latch 30. A cutter deck assembly 40 is located generally centrally of the frame 12 and includes as its principal components a cutter deck 42 and a deck suspension system 44 that suspends the cutter deck from lawnmower frame 12.

Except for being adapted to accommodate a cutter deck locator assembly (described below), cutter deck 42 is standard. Cutter deck 42 is formed from a metal housing having an upper surface 46 from which depend front 48, rear 50, left 52, and right 54 side walls. Cutter deck 42 may be formed to include a discharge opening generally formed in side wall 54 and connected to a discharge chute 55. Alternatively, it may be generally enclosed to provide a bottom discharging mulching mower deck, or may be a rear discharge or baggage collection mower deck. A number of front roller assemblies 58 and rear roller assemblies (not shown) are mounted on the front and rear walls 48 and 50. The bottoms of the rollers are spaced just below the bottom of the cutter deck 42 so as to be spaced from the ground during normal use but so as to ride up and over any obstructions during use to avoid ground scalping and damage to the cutter deck 42.

Figure 6:
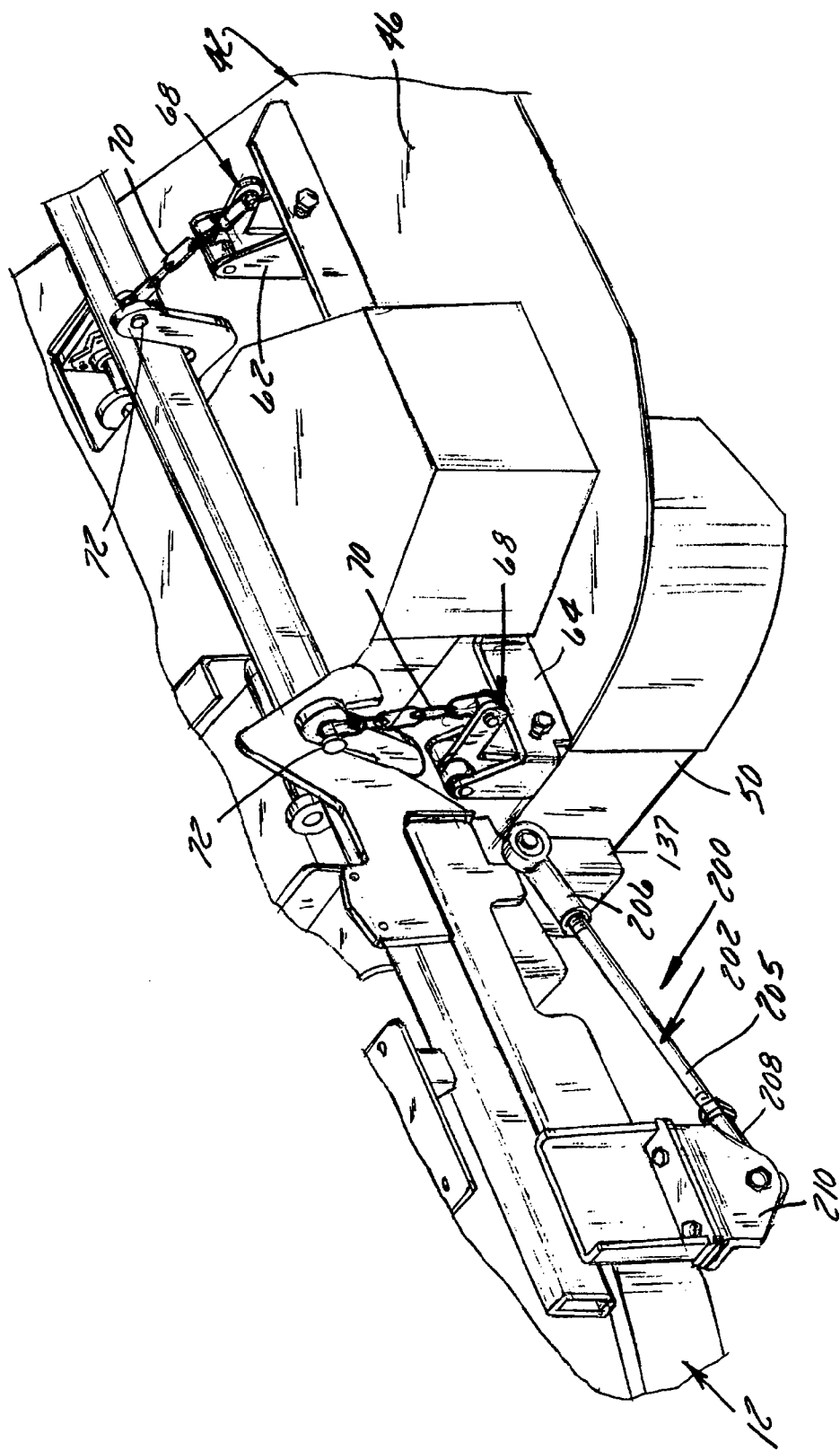
FIG. 6 is fragmentary perspective view of a portion of the cutter deck, a portion of the frame, and a fore and aft locator of the locator assembly constructed in accordance with a preferred embodiment of the invention.

A number of transversely spaced cutting blades (not shown) are housed in the cutter deck 42. The number of blades and the size of each blade will vary with the size of cutter deck 42. Referring briefly to FIG. 6, the upper surface 46 of cutter deck 42 also supports brackets 62, 64 that receive mounting hardware for the cutter deck 42, including hardware for a number of deck leveler assemblies 68.

Referring again to FIG. 1, deck suspension system 44 includes a suspension assembly 66 and a plurality of cutter deck leveler mechanisms or assemblies 68. The suspension assembly 66 includes flexible supports suspending the cutter deck 42 from the frame 12. These supports comprise chains 70 in the illustrated embodiment but could comprise other flexible structures such as straps or other variable-length supports such as a linkage including a slotted bar. Four chains 70 are provided in this embodiment, one located in the vicinity of each corner area of the cutter deck 42. The upper ends of the chains 70 are suspended from the frame 12 by upper cranks 72 that are coupled to each other so that they rotate in unison. The cranks 72 are connected to deck lift pedal 28 via a linkage including a cable 29 (FIG. 1). The resulting assembly forms a deck lift mechanism that, upon releasing the latch 30 and operating the deck lift pedal 28, can be operated to actuate all four cranks 78 simultaneously to raise or lower the entire cutter deck 42 relative to frame 12 as a unit. This suspension assembly is detailed in co-pending and commonly assigned U.S. patent application Ser. No. 11/945,764, the subject matter of which is incorporated herein by reference in its entirety.

The suspension system 44 of the illustrated embodiment additionally includes a plurality of independently operable cutter deck leveler assemblies 68 that can be operated to adjust the height of each corner portion of the cutter deck independently of the other portions serviced by the other assemblies. The cutter deck leveler assemblies 68 are described in greater detail in co-pending and commonly assigned U.S. patent application Ser. No. 11/945,734, the subject matter of which is incorporated herein by reference in its entirety.

Pursuant to the invention, a deck locator assembly is provided that includes at least a side-to-side deck locator 100 and may additionally include a fore and aft deck locator 200. The side-to-side deck locator 100 permits the cutter deck 42 to move vertically and to pivot about both longitudinal and lateral axes while permitting limited side-to-side motion. The fore and aft deck locator 200 permits the cutter deck 42 to move vertically and to pivot about both longitudinal and lateral axes while limiting or preventing fore and aft motion. The locators 100 and 200 could be employed on the same lawnmower 10 as illustrated, or one or both of the locators could be omitted or replaced with a locator of different design.

As best seen in FIGS. 2-5, side-to-side deck locater 100 includes laterally-spaced bearing assemblies 102 and 104 that are spaced from associated stops 106 and 108 when the deck 42 is centered over a longitudinal centerline CL (FIG. 2) of the lawnmower frame 12 and the lawnmower 10. When the cutter deck 42 moves laterally in one direction, the relevant bearing assembly 102 or 104 engages an associated stop 106 or 108. The abutting relationship between a relevant one of the bearing assembly 102 or 104 and the associated stop 106 or 108 prevents any additional lateral cutter deck movement but does not interfere with vertical movement or pivoting movement about either a lateral axis or a longitudinal axes. The bearing assemblies 102 and 104 could be disposed outboard of the corresponding stops 106 and 108 rather than inboard. In addition, the bearing assemblies 102 and 104 could be mounted on the cutter deck 42 rather than the frame 12, and the stops could be mounted on the frame 12 rather than the cutter deck 42. In the illustrated embodiment, however, the bearing assemblies 102 or 104 are mounted on the frame 12 and are disposed laterally inwardly of the corresponding stops 106 and 108, which are mounted on the cutter deck 42.

Figure 3:
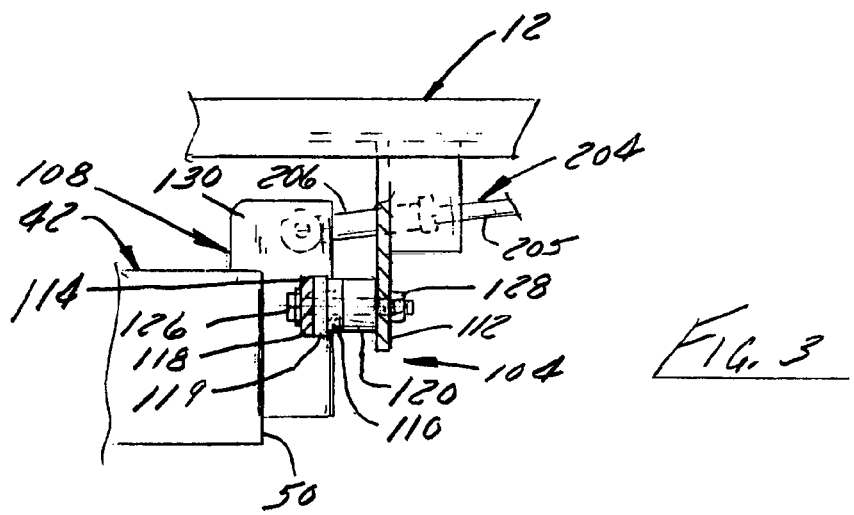
FIG. 3 is a side sectional elevation view of one of the bearings of a side-to-side locator of the deck locator assembly of FIG. 2, taken generally along lines 3-3 in FIG. 2.
Figure 4:
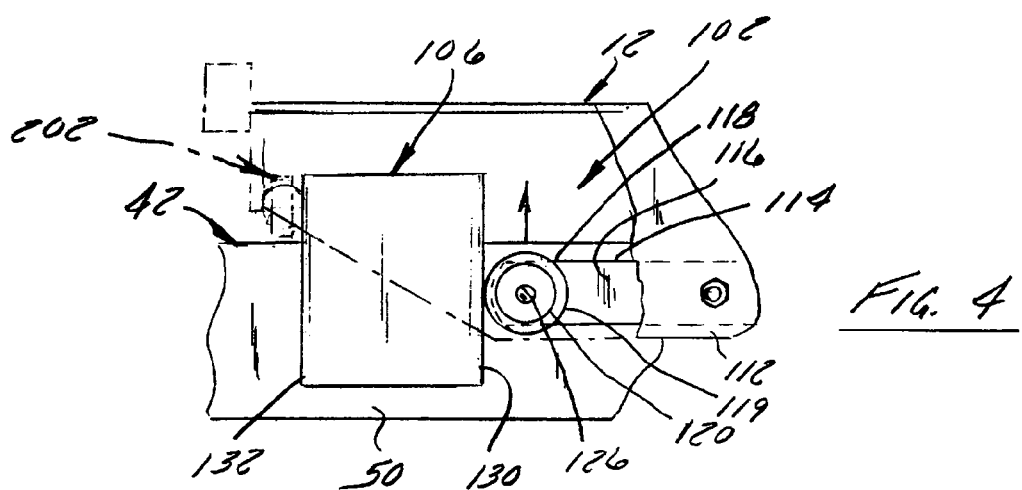
FIG. 4 is a sectional elevation view of one of the bearing assemblies of the side-to-side deck locator, taken generally along lines 4-4 in FIG. 2.
Figure 5:
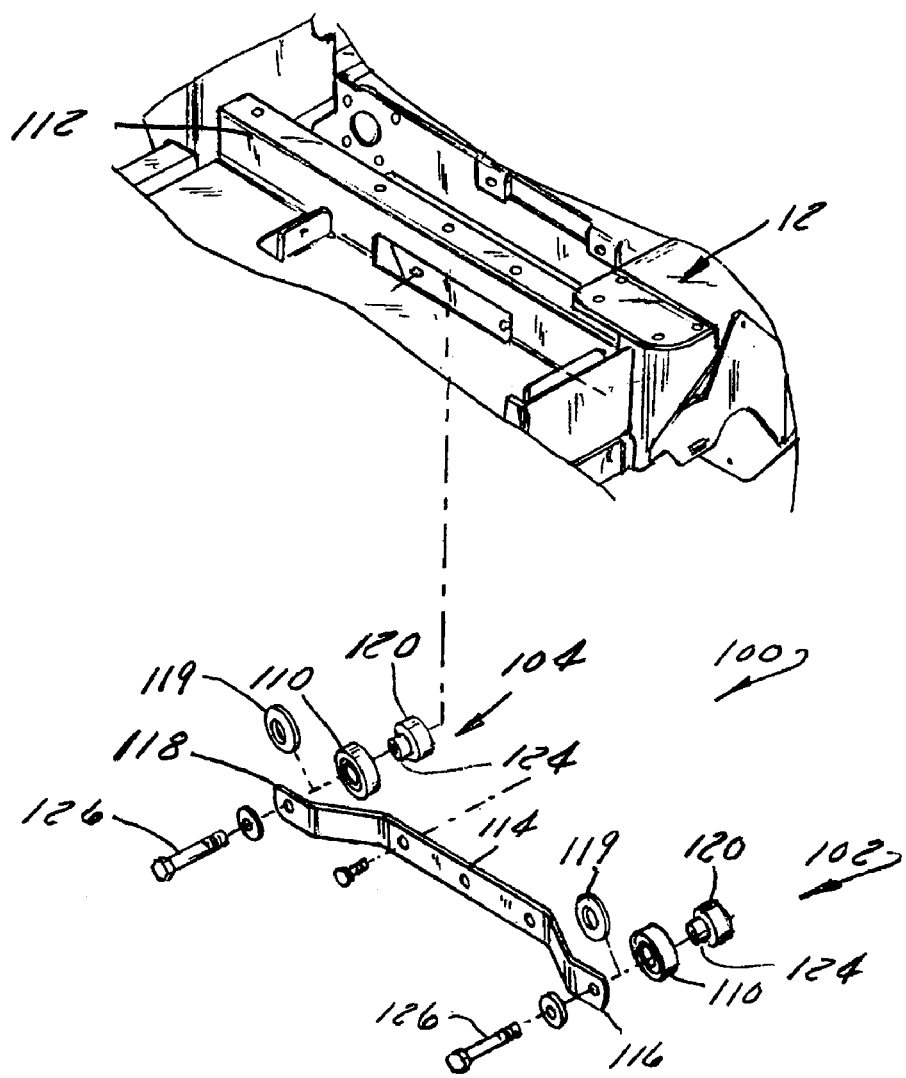
FIG. 5 is an exploded view of the side-to-side deck locator of the deck locator assembly of the cutter deck assembly of FIGS. 1-3.

Each bearing assembly 102 or 104 comprises a bearing 110 in the form of an annular disk 110 clamped between a vertically depending plate 112 on the frame 12 and a mounting bar 114. A single mounting bar 114 and single plate 112 are employed in this embodiment. The plate 112 extends laterally along nearly the entire width of the frame 12. The mounting bar 114 is bolted directly to the plate 112 at its center portion and is bent outwardly at opposed ends 116 and 118 to form receptacles for the bearing assemblies 102 and 104. As best seen in FIG. 3-5, each bearing 110 is clamped between the mounting bar 114 and the plate 112 by a spacer 120 of reduced diameter when compared the diameter of the bearing 110. The spacer 120 is stepped so as to provide a shaft 124 (FIG. 5) for supporting the bearing 110. A bolt 126 extends through the bar 114, through the bearing 110, through the spacer 120 and the plate 112, and is held in place by a nut 128. The bearing 110 may be either rigid or compressible and may either be fixed in place or may rotate upon contact with the associated stop. In this embodiment, a washer 119 is clamped between the inner race of the bearing 110 and the bar 114 so as to hold the inner race of the bearing 110 from rotation while permitting the outer race of the bearing 110 to rotate. The width of the spacing between each bearing 110 and the associated stop 106 or 108 in the centered position of the cutter deck 42 is largely a matter of design choice. It should be sufficiently wide to permit limited lateral movement of the cutter deck 42 upon encountering an obstruction, hence reducing the chances of damaging the cutter deck. However, it should not be so wide as to permit free-swinging movement of the cutter deck 42 and the resultant possible uneven cut. A spacing of 1/16" to 3/4" and, more preferably, 1/4" to 1/2", is currently preferred.

Each stop 106 and 108 may comprise any surface that is engaged by the bearing assembly 110 upon the above-described lateral movement of the cutter deck 42. It should be sufficiently rigid to arrest the cutter deck 42 from additional lateral movement upon engagement with the associated bearing, and sufficiently long to be engaged by the bearing 110 regardless of the vertical position of the cutter deck 42 relative to the frame 12. Referring to FIGS. 2-4, the stop 106 or 108 of the illustrated embodiment includes a vertically extending plate 130 welded or otherwise affixed to the rear wall 50 of the cutter deck 42. It extends rearwardly from the rear wall 50 of the cutter deck 42 a sufficient distance to be flush with or, preferably, extend behind the rear surface of the bearing 110 so as to assure bearing-to-stop contact upon lateral movement of the cutter deck 42. In the illustrated embodiment, the plate 130 comprises the inner wall of a C-shaped channel mounted on the rear wall 50 of the cutter deck 42, the outer wall 132 of which forms a mounting surface for an associated turnbuckle of the fore and aft locator 200 as described below.

In addition to permitting unhindered vertical deck motion and deck pivoting, the side-to-side deck locator 100 described above is maintenance free, durable, and simple and inexpensive to manufacture and install. It also lacks any need for adjustment.

As discussed above, the locator assembly preferably, but not necessarily, also includes a fore and aft locator 200 that couples the cutter deck 42 to the frame 12 so as to at least substantially prevent fore and aft movement of the cutter deck 42 relative to the frame 12. In the illustrated embodiment, the fore and aft locator 200 is formed from a pair of adjustable-length rods, namely turnbuckles 202 and 204, located on opposite sides of the lawnmower 10 as seen in FIG. 2. Each of the turnbuckles 202 and 204 is identical in construction and operation. Hence, only the right turnbuckle 202 will be described, it being understood that the description applies equally to the left turnbuckle 204.

Referring to FIG. 6, the turnbuckle 202 comprises a central threaded rod 205 screwed into an internally threaded connectors at both ends 206 and 208. The length of the turnbuckle 202 can be adjusted by turning the rod 205 into or out of the turnbuckle ends 206 and 208 so as to shorten or length the effective length of the turnbuckle and adjust the position of the cutter deck 42 longitudinally of the frame 12.

The upper front end 206 of the turnbuckle 202 is pivotally attached to the outer wall 132 of the channel, and the lower rear end 208 is pivotally attached to an ear mount 210. The ear mount 210 is welded to or otherwise affixed the frame 12. These connections permit the cutter deck 42 to swing up and down relative to the frame 12 while preventing any fore and aft movement apart from that inherent in the slight arc of the swinging turnbuckle 202. They also permit the deck 42 to move laterally relative to the frame 12, to the extent that such movement is permitted by the side-to-side locator 100, as well as to pivot about both the longitudinal and lateral axes.

In use, the deck 42 may be normally positioned centrally of the lawnmower 10 as best seen in FIG. 2. In practice, however, the cutter deck 42 is biased to the left side of the mower 10 by spring tensioning of the drive belt for the blades. As a result, the bearing assembly 104 is normally held against the associated stop 108. If the deck 42 encounters an obstruction tending to force it sideways it can move in that direction until the relevant bearing assembly 102 or 104 of the side-to-side locator 100 abuts against the associated stop 106 or 108. This motion is exemplified in the drawings by engagement of the bearing assembly 102 with the stop 106 in FIG. 4. However, fore and aft motion is prevented by the turnbuckles 202 and 204 of the fore and aft locator 200. Both locators 100 and 200 permit uninhibited vertical motion, occurring either due to the encountering of an obstruction or due to operator-controlled raising or lowering of the deck 42. That motion is illustrated by the arrow in FIG. 4. Both locators 100 and 200 also permit the deck 42 to pivot about both the longitudinal and lateral axes, permitting the deck 42 to follow ground undulations and to at least partially accommodate obstructions that the deck 42 may encounter.

Although the best mode contemplated by the inventor of carrying out the present invention is disclosed above, practice of the present invention is not limited thereto. It will be manifest that various additions, modifications and rearrangements of the features of the present invention may be made in addition to those described above without deviating from the spirit and scope of the underlying inventive concept. The scope of some of these changes is discussed above. The scope of other changes to the described embodiments that fall within the present invention but that are not specifically discussed above will become apparent from the appended claims and other attachments.

I claim:

1. A lawnmower comprising:
   a ground supported frame;
   an engine and operator's controls supported at least indirectly on the frame; and
   a cutter deck assembly comprising:
   a cutter deck having front and rear walls and an upper surface;
   a plurality of variable-length supports suspending distinct portions of the cutter deck from the lawnmower frame; and
   a side-to-side deck locator comprising first and second laterally spaced bearings that are disposed longitudinally between the cutter deck and the frame, each of the bearings being laterally spaced from a corresponding stop when the deck is centered relative to a longitudinal centerline of the frame and permitting limited lateral movement of the cutter deck relative to the frame through a stroke corresponding to the width of the space, each of the bearings being movable vertically along the correspond stop so as to permit uninhibited vertical movement of the cutter deck relative to the frame and pivoting of the cutter deck about longitudinal and lateral axes.

2. The lawnmower of claim 1, wherein the stops are located outboard of the bearings.

3. The lawnmower claim 1, wherein the width of the spaces is between 1/16" and 3/4".

4. The lawnmower claim 3, wherein the width of the spaces is between 1/4" and 3/4".

5. The lawnmower of claim 1, wherein each of the bearings has a circular outer periphery that rides along the corresponding stop.

6. The lawnmower of claim 3, wherein the bearings are mounted on the frame and the stops are mounted on the cutter deck, and wherein each of the bearings is held in place by being clamped between a vertical surface on the frame and a mounting bar.

7. The lawnmower of claim 4, further comprising a spacer clamped between each bearing and the vertical surface of the frame.

8. The lawnmower of claim 1, wherein the bearings are mounted on the frame and the stops are mounted on the cutter deck.

9. The lawnmower of claim 1, wherein each of the stops comprises a vertical plate.

10. The lawnmower of claim 1, further comprising a fore and aft locator connected to the cutter deck and to the frame to at least substantially prevent fore and aft movement of the cutter deck relative to the frame.

11. The lawnmower of claim 10, wherein the fore and aft locator comprises an adjustable-length rod that is pivotally attached to the frame and the cutter deck.

12. The lawnmower of claim 10, wherein the fore and aft locator comprises a turnbuckle.

13. The lawnmower of claim 1, wherein the cutter deck is biased toward a position in which one of the bearings engages the corresponding stop.

14. A lawnmower comprising:
    a ground supported frame;
    an engine and operator's controls supported at least indirectly on the frame; and
    a cutter deck assembly comprising:
    a cutter deck having front and rear walls and an upper surface;
    a plurality of variable-length supports suspending distinct portions of the cutter deck from the lawnmower frame; and
    a side-to-side deck locator comprising first and second laterally spaced bearings that are disposed longitudinally between the cutter deck and the frame and that are mounted on the frame, each of the bearings being laterally spaced inwardly from an inboard wall of a channel on the rear wall of the cutter deck by between 1/16" and 3/4" when the deck is centered relative to the frame and permitting limited lateral movement of the cutter deck relative to the frame through a stroke corresponding to the width of the space, each of the bearings being movable vertically along the corresponding channel wall so as to permit uninhibited vertical movement of the cutter deck relative to the frame and pivoting of the cutter deck about longitudinal and lateral axes.

15. The lawnmower of claim 14, wherein the width of each space is between 1/4" and 1/2".

16. The lawnmower of claim 14, wherein each of the bearings is held in place by being clamped between a vertical surface on the frame and a mounting bar.

17. The lawnmower of claim 16, further comprising a spacer clamped between each bearing and the vertical surface of the frame.

18. The lawnmower of claim 14, further comprising a fore and aft locator comprising first and second turnbuckles each of which is pivotally connected to the frame at one end thereof and to an outer wall of a respective channel at another end thereof.

19. The lawnmower of claim 14, wherein the cutter deck is biased toward a position in which one of the bearings engages the corresponding stop.

* * * * *